United States Patent
Kitanov et al.

(10) Patent No.: US 11,513,533 B2
(45) Date of Patent: Nov. 29, 2022

(54) TOPOLOGICAL BELIEF SPACE PLANNING

(71) Applicant: Technion Research & Development Foundation Limited, Haifa (IL)

(72) Inventors: Andrej Kitanov, Zagreb (HR); Vadim Indelman, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 247 days.

(21) Appl. No.: 16/799,200

(22) Filed: Feb. 24, 2020

(65) Prior Publication Data

US 2020/0272171 A1    Aug. 27, 2020

Related U.S. Application Data

(60) Provisional application No. 62/809,654, filed on Feb. 24, 2019.

(51) Int. Cl.
G05D 1/02        (2020.01)

(52) U.S. Cl.
CPC .................. *G05D 1/0287* (2013.01)

(58) Field of Classification Search
None
See application file for complete search history.

(56) References Cited

U.S. PATENT DOCUMENTS

2006/0224547 A1* 10/2006 Ulyanov ................ B82Y 10/00
706/62

FOREIGN PATENT DOCUMENTS

| CN | 103645725 | * | 8/2016 |
| CN | 107065859 | * | 8/2017 |
| CN | 109255475 | * | 1/2019 |

OTHER PUBLICATIONS

Ou, CN107065859-MT, machine translation of Foreign Reference (EPO) (Year: 2017).*
Gao, CN109255475A-MT, machine translation of Foreign Reference (Year: 2019).*
Cheng, CN103645725-MT, machine translation of Foreign Reference (Year: 2016).*
Ou, CN107065859-MT, machine translation of Foreign Reference (Year: 2017) (Google) (Year: 2017).*
Kasra Khosoussi, et al. "Reliable Graphs for Slam", 2019, The international Journal of Robotics Research, vol. 38 (2-3), pp. 260-298 (Year: 2019).*

(Continued)

*Primary Examiner* — Yuen Wong
*Assistant Examiner* — Hongye Liang
(74) *Attorney, Agent, or Firm* — Novick, Kim & Lee PLLC; Jae Youn Kim (57) ABSTRACT

Methods and systems are provided for belief space planning for multiple robots at an initial belief state, for reducing belief space uncertainty, including receiving multiple, candidate, multi-robot paths, each including one or more pose constraints; generating a candidate factor graph for each candidate multi-robot path, and generating from each candidate factor graph a topology graph; calculating a signature metric from each topology graph, wherein the signature metric is one of a Von Neumann (VN) metric and a spanning tree (ST) metric; selecting a multi-robot path having the greatest signature metric from among the candidate, multi-robot paths; and instructing the multiple robots to proceed according to the selected multi-robot path.

4 Claims, 8 Drawing Sheets

(56) References Cited

OTHER PUBLICATIONS

Ou, CN107065859-MT, machine translation of Foreign Reference (EPO), 2017 (Year: 2017).*

Gao, CN109255475A-MT, machine translation of Foreign Reference, 2019 (Year: 2019).*

Cheng, CN103645725-MT, machine translation of Foreign Reference, 2016 (Year: 2016).*

Atanasov et al., "Decentralized active information acquisition: Theory and application to multi-robot Slam," IEEE Intl. Conf. on Robotics and Automation (ICRA), (2015).

Regev et al., "Decentralized multirobot belief space planning in unknown environments via identification and efficient reevaluation of impacted paths," Autonomous Robots.

Ranganathan et al., "Online probabilistic topological mapping," Intl. J. of Robotics Research, vol. 30, No. 6, pp. 755-771. (2011).

Khosoussi et al., "Novel insights into the impact of graph structure on Slam," in "2014 IEEE/RSJ International Conference on Intelligent Robots and Systems," IEEE,,pp. 2707-2714. (2014).

Elimelech et al., "Fast action elimination for efficient decision making and belief space planning using bounded approximations," Proc. of the Intl. Symp. of Robotics Research (ISRR),(2017).

Chung, "Spectral graph theory," 92, American Mathematical Soc. (1997).

Passerini et al., "Quantifying Complexity in Networks: The Von Neumann Entropy," Int. J. Agent Technol. Syst., vol. 1, No. 4, (2009).

Khosoussi et al., "Reliable graph topologies for Slam," IJRR, (2018).

* cited by examiner

TOPOLOGICAL BELIEF SPACE PLANNING

CLAIM OF PRIORITY

This application claims priority under 35 USC § 119(e) to U.S. Patent Application Ser. No. 62/809,654, filed on Feb. 24, 2019, which is hereby incorporated by reference.

FIELD OF THE INVENTION

The present invention relates to robotic perception and navigation.

BACKGROUND

A belief space is a space of probability distributions indicative of estimates of a system's state. Belief space planning (BSP) involves determining optimal controls to be applied to a system described by a belief state, in order to obtain a given set of goals, within constraints of an objective function. A BSP paradigm may be applied to planning the navigation of multiple robots, where goals may be for each robot to reach a given final respective state (i.e., position), and the objective function may be to minimize uncertainty (i.e., entropy). The problem may be formulated as an active Simultaneous Localization and Mapping (SLAM), in which robots, while operating in an unknown or uncertain environment, must autonomously decide their future motion and estimate their own poses and the state of the environment, using only on-board sensors (i.e., no predefined maps or GPS).

In a decentralized, discrete BSP framework, each robot r in a group of R robots is assumed to generate a finite number of candidate sets of control functions, each leading to a sequence of subsequent belief states. Determining the optimal controls involves considering all path combinations (i.e., all "factor graph" combinations) of all the robots ((NR combinations), which is computationally intractable for large number of candidate paths and high-dimensional state spaces because evaluating the objective function for each combination involves multi-robot inferences. The process of multi-robot SLAM may be viewed as a partially observable Markov decision process (POMDP). Even for finite planning horizons, given discrete states, actions, and observations, solving exactly a decentralized POMDP has been shown to be nondeterministic exponential (NEXP) complete.

A common sub-optimal approach for decentralized belief space planning is for each robot r to consider only its own candidate paths and the announced paths of other robots. The robot can then select the best path, according to the objective function, and announce this path to other robots, which then repeat the same procedure on their end. Such an approach reduces the exponential complexity in number of robots to a linear complexity, and can be viewed as a decentralized coordindated descent, i.e. where robots either repeat this process until convergence. Performance guarantees of such an approach are analyzed by Atanasov, et al., "Decentralized active information acquisition: Theory and application to multi-robot SLAM," IEEE Intl. Conf. on Robotics and Automation (ICRA), 2015, which is hereby incorporated by reference.

An approach of identifying and re-using calculations for candidate paths due to an update in the announced path is described in Regev and Indelman, "Decentralized multi-robot belief space planning in unknown environments via identification and efficient re-evaluation of impacted paths," Autonomous Robots, doi:10.1007/s10514-017-9659-4, which is hereby incorporated by reference. However, this strategy still requires $R \cdot N \cdot N_{iter}$ objective function evaluations, where $N_{iter}$ is the number of iterations until all robots reach an agreement. The further problem of the announced paths approach is that it may determine a local rather than optimal solution, depending on the initialization.

Topological representations in SLAM have been studied with respect to representations of the environment. A systematic algorithm for probabilistic topological mapping of an environment from a sequence of sensor-independent measurements was proposed by Ranganathan and Dellaert, "Online probabilistic topological mapping," Intl. J. of Robotics Research, Vol. 30, No. 6, 2011, pp. 755-771, which is hereby incorporated by reference. For general non-linear SLAM, the determinant of the information matrix may be strongly positively correlated with tree-connectivity of the topology graph, and used for graph pruning, as described by Khosoussi, et al., "Novel insights into the impact of graph structure on SLAM," in "2014 IEEE/RSJ International Conference on Intelligent Robots and Systems," IEEE, 2014, pp. 2707-2714, which is hereby incorporated by reference.

SUMMARY OF THE INVENTION

The present invention provides an application of a topological approach to Belief Space Planning (BSP) to solving multi-robot active Simultaneous Localization and Mapping (SLAM) problems. In embodiments of the present invention, a method is provided for determining a set of optimal motion and measurement controls for the navigation of multiple robots in an unknown environment to minimize state uncertainty, the method including: receiving multiple, candidate, multi-robot paths, each including one or more pose constraints; generating a candidate factor graph for each candidate multi-robot path, and generating from each candidate factor graph a topology graph; calculating a signature metric from each topology graph, wherein the signature metric is one of a Von Neumann (VN) metric and a spanning tree (ST) metric; selecting a multi-robot path having the greatest signature metric from among the candidate, multi-robot paths; and instructing the multiple robots to proceed according to the selected multi-robot path. The method may also include calculating error bounds and determining that an uncertainty measure of the selected multi-robot path meets design specifications for accuracy and relative error with respect to an optimal solution.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

An optimal non-myopic control action $\mathcal{U}^*_{k:k+L-1}$ at planning time k is found with respect to the objective function J related to the design task as $$\mathcal{U}^*_{k:k+L-1} = \arg\min_{\mathcal{U}} \ J_k(\mathcal{U}), \text{ where for } \mathcal{U} = \mathcal{U}_{k:k+L-1} \quad (1)$$

$$J_k(\mathcal{U}) = \mathbb{E}_{\mathcal{Z}} \left\{ \sum_{l=0}^{L-1} c_l[b(X_{k+l}), \mathcal{U}_{k+l}] + c_L[b(X_{k+L})] \right\}.$$

In the BSP problem, the state of the system X is not directly observable, but is estimated through a set of stochastic measurements $\mathcal{Z}$ from which the future posterior beliefs $b(X_{k+l})$ must be inferred upon optimization. Expectation is determined with respect to future observations $\mathcal{Z}_{k-1:k+L}$. The optimal solution of BSP provides a control strategy $\mathcal{U}^*_{k:k+L-1}$ for L look-ahead steps, and L can generally vary among control actions.

The objective function in its general form reflects the design task through intermediate cost functions $c_l$, which depend on belief evolution $b[X_{k+l}]$ and a control action $U_{k+l}$ applied at time $t_{k+l}$, and through a final cost $c_L$. For example, the cost functions can be chosen to minimize trajectory uncertainty, time or energy required to reach a goal, state uncertainty of variables of interest at some specific time instant etc. In one embodiment of the present invention, optimal solutions are provided for reducing state uncertainty for active SLAM, which is often the most computationally intensive BSP problem in robotics. Active SLAM includes simultaneously estimating the robot's pose and the map of the environment, while planning for the path that improves both estimates.

Hereinbelow, path uncertainty is quantified by joint entropy. Measurements are assumed to be expressed in the form of pairwise relations between states. Robots' landmark measurements are given relative to the robot's pose, e.g. as a range or as bearing measurements. Mobile robots are assumed to operate in an unknown or uncertain environment that, given a task (e.g. exploring or reaching certain goal), aims to autonomously decide their future actions based on information accumulated thus far. For clarity we only consider the final state cost term $\mathbb{E}[c_L(b[X_{k+L}])]$, i.e. the joint entropy at the end of the planning horizon. The intermediate cost functions can be treated in a similar way.

Assuming the belief is modeled by a multivariate Gaussian distribution and taking the common maximum likelihood (ML) observations assumption, the objective function becomes $$J_k(U) = N/2 \ \ln(2\pi e) - \frac{1}{2} \ \ln|I(X_{k+L})|, \quad (2)$$

where $I(X_{k+L})$ denotes the estimated Fisher information matrix of the robot's belief $b[X_{k+L}]$, and N represents the dimension of the state $X_{k-L}$. Notice that minimizing the global entropy (2) corresponds to maximizing the total information gain obtained by executing this trajectory, i.e. maximizing the estimation accuracy.

Solving the optimization problem (1) explicitly (i.e., the "optimal solution") would require belief propagation for all given controls in evaluating the objective function. In embodiments of the present invention, referred to herein as topological BSP, the ranking of candidate control actions is based on the topology of their associated belief states. That is, the original problem (1) is reformulated in a topological space, where it can be solved more easily, and then, its solution is related to the solution of the original problem. Topological BSP aims to determine a topological signature s: $G \rightarrow \mathbb{R}$, which is highly correlated with the cost function and maintains action consistent decision making.

Single Robot Case

The belief state evolves over time, and includes the controls and observations obtained up until the planning time $t_k$ and the subsequent controls and observations for planning L look-ahead steps.

Hereinbelow, $\mathbb{P}(X_k | \mathcal{H}_k)$ represents the posterior probability density function (pdf) at planning time $t_k$ over states of interest $X_k$ of the robot. In the pose SLAM framework, states of interest include a robot's current and past poses, i.e. $X_k = \{x_0, x_1, \ldots, x_k\}$. History $\mathcal{H}_k \doteq \{\mathcal{Z}_{1:k}, U_{0:k-1}\}$ contains all observations $\mathcal{Z}_{1:k}$ and controls $U_{0:k-1}$ by time $t_k$. Consider conventional state transition and observation models $$x_{i+1} = f(x_i, u_i) + w_i, \ z_{i,j} = g(x_i, x_j) + v_{i,j}, \quad (3)$$

with zero-mean Gaussian process and measurement noise $w_i \sim N(0, \Omega_w^{-1})$ and $v_{i,j} \sim N(0, \Omega_{v_{ij}}^{-1})$, and with known information matrices $\Omega_w$ and $\Omega_{v_{ij}}$. Belief $\mathbb{P}(X_k | \mathcal{H}_k)$ is then $$\mathbb{P}(X_k | \mathcal{H}_k) \propto \mathbb{P}(x_0) \prod_{i=1}^{k} \mathbb{P}(x_i | x_{i-1}, u_{i-1}) \mathbb{P}(Z_i | X_i). \quad (4)$$

The future sampled states of the robot along one of its candidate paths $\mathcal{P}$ generated at planning time $t_k$ are $\{x_{k+1}, \ldots, x_{k+L}\}$. The future posterior belief $b[X_{k+L}] = \mathbb{P}(X_{k+L} | \mathcal{Z}_{1:k+L}, U_{0:k+L-1})$ that would be obtained by following the path $\mathcal{P}$, can be written in terms of the belief at planning time $\mathbb{P}(X_k | H_k)$ and the corresponding state transition and observation models as $$b[X_{k+L}] = \mathbb{P}(X_k | \mathcal{H}_k) \prod_{l=k+1}^{k+L(\mathcal{P})} \mathbb{P}(x_l | x_{l-1}, u_{l-1}) \mathbb{P}(Z_l | X_l), \quad (5)$$

where $\mathcal{U}_{k:k+L-1}$ and $\mathcal{Z}_{k+1:k+L}$ represent controls and (unknown) observations, respectively, to be acquired by following the path $\mathcal{P}$.

Each candidate action corresponds to a posterior belief $b[X_{k+L}]$, i.e. a trajectory uncertainty that can be represented by a factor graph, which, in turn, can be represented by a topology. In the case of active pose SLAM, a topology can be defined by a simple undirected graph G=(V, E) such that graph nodes V represent robot's poses and edges E pose constraints between them. Pose constraints are typically poses at which there are common observations that are made either by different robots or by the same robot at different discrete times. Notice that the initial poses of the robots $x_0$ are known, that is, it is a deterministic node in the factor graph, making the initial nodes a shared constraint of all robots.

Multi-Robot Case

In a multi-robot framework, each robot maintains a joint belief $\mathbb{P}(X_k | \mathcal{H}_k)$ on its own while communicating to each other relevant pieces of information. For R robots in a group, $\mathbb{P}(X_k | \mathcal{H}_k)$ represents the pdf over the joint state $X_k$ at time $t_k$, i.e. $X_k \doteq \{X_k^r\}_{r=1}^R$ and $\mathcal{H}_k \doteq \{\mathcal{Z}_{1:k}, U_{0:k-1}\}$, with $\mathcal{Z}_{1:k} \doteq \{\mathcal{Z}_{1:k}^r\}_{r=1}^R$ and $\mathcal{U}_{0:k-1} \doteq \{\mathcal{U}_{0:k-1}^r\}_{r=1}^R$.

Note that given transition and observation models (3), it is sufficient for each robot to only transmit (in addition to what is required by multi-robot inference) its own control actions. Any other robot that receives this information can then formulate the multi-robot belief $\mathbb{P}(X_k | \mathcal{H}_k)$. If we consider different paths $\mathcal{P}^r$ for each robot $r \in \{1, \ldots, R\}$, the future posterior multi-robot belief associated to a control action $\mathcal{P} \doteq \{\mathcal{P}^r\}_{r=1}^R$, is given by $$b[X_{k+L}] = \mathbb{P}(X_k | \mathcal{H}_k) \prod_{r=1}^R \left[ \sum_{l=1}^{L(\mathcal{P}^r)} \mathbb{P}(x_{k+l}^r | x_{k+l-1}^r, u_{k+l-1}^r) \cdot \mathbb{P}(Z_{k+l}^r | X_{k+l}^r) \prod_{(i,j)} \mathbb{P}(z_{i,j}^{r,r'} | x_i^r, x_j^{r'}) \right] \quad (6)$$

where the last product corresponds to multi-robot (MR) constraints that can involve different time instances, representing mutual observations of a scene.

The ordered index set $\{i, j\}$ in eq. (6) represents the time indices that facilitate multi-robot pose constraints among the robots $\{r, r'\}$. We assume a given criteria function $cr_{MR}(x_i^r, x_j^{r'})$ that determines if there should be a multi-robot constraint between the two nodes $x_i^r$ and $x_j^{r'}$ such as relative distance between robots.

A joint belief (6) can be represented by a factor graph model (an illustration of which is provided in FIG. 2, described below). A factor graph (FG) is a bipartite graph whose nodes consist of factors F and variables V. The variables represent the random variables in the estimation problem, whereas the factors represent probabilistic information on those variables, derived from measurements or prior knowledge. Different candidate paths $\mathcal{P}$ typically yield different factor graphs.

A topology may be induced by an FG to represent a multi-robot belief (6). In the case F contains only binary factors, topology of the FG can be further simplified in the following way.

Defining $\mathcal{L}$ as a vertex labeling function of FG that assigns to its variables V a set of unique labels $\Gamma = \{1, 2, \ldots, |V|\}$.

We define a topological graph $G \doteq (\Gamma, E)$ as a graph whose nodes are in the set $\Gamma$ and whose edges are $E = \{(i,j), i,j \in \Gamma \Leftrightarrow$ a factor exists in F involving variables $\mathcal{L}^{-1}(i)$ and $\mathcal{L}^{-1}(j)\}$.

A Laplacian matrix of a graph G is by definition $L(G) = D(G) - A(G)$, where $A(G)$ is its $|\Gamma| \times |\Gamma|$ adjacency matrix with elements $$A(i,j) \doteq \begin{cases} 1, & \text{if } (i,j) \in E \\ 0, & \text{otherwise} \end{cases} \quad (7)$$

and D(G) its node degree matrix defined as a diagonal matrix with graph node degrees on its main diagonal, i.e. $D(i,i) = d(i) = \Sigma_{j \in \Gamma} A(i,j)$. Finally, a normalized Laplacian matrix is defined as $\hat{L}(G) = D^{-1/2} L D^{-1/2}$ which can be also written in the form $$\hat{L}(i,j) = \begin{cases} 1, & \text{if } i = j, d(i) \neq 0 \\ \dfrac{-1}{\sqrt{d(i)d(j)}}, & (i,j) \in E \\ 0, & \text{otherwise} \end{cases} \quad (8)$$

We define a spectral decomposition of the normalized Laplacian matrix to be $\hat{L} = Q \Lambda Q^{-1}$, where $\Lambda = \text{diag}(\hat{\lambda}_1, \hat{\lambda}_2, \ldots, \hat{\lambda}_{|\Gamma|})$ is a diagonal matrix of the eigenvalues of $\hat{L}$, and Q is an orthogonal matrix whose columns are their corresponding eigenvectors. The normalized Laplacian matrix of G is symmetric and positive semi-definite so all its eigenvalues are real and non-negative. Hence, they can be ordered $$\hat{\lambda}_1 \leq \hat{\lambda}_2 \leq \ldots \leq \hat{\lambda}_{|\Gamma|},$$

with $\hat{\lambda}_1 = 0$, $\hat{\lambda}_{|\Gamma|} \leq 2$, and $\Sigma_{i=1}^{|\Gamma|} \hat{\lambda}_i = |\Gamma|$ (because G has no isolated nodes, as described in Chung, "Spectral graph theory," 92, American Mathematical Soc., 1997, which is incorporated herein by reference).

Figure 1:
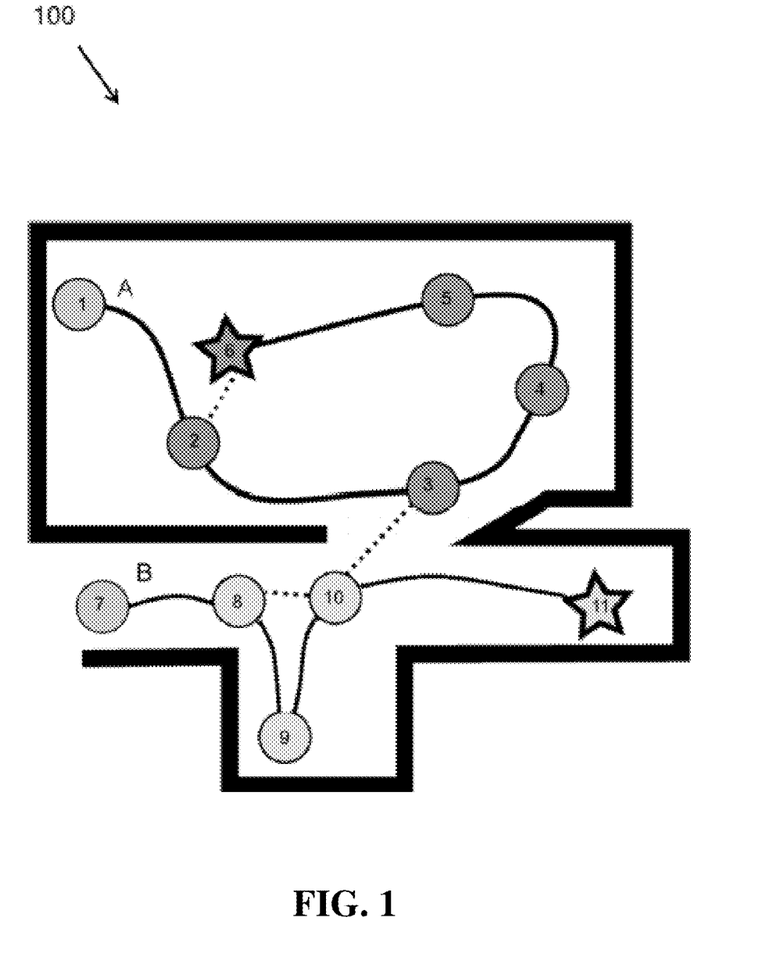
FIG. 1 is a schematic diagram of a set of two candidate navigation paths for two robots, A and B, for a given control action, according to an embodiment of the present invention.

FIG. 1 shows a set of two candidate navigation paths for two robots, A and B. For a given control action (i.e., set of controls) Robot A plans to make observations at six poses (1-6) and robot B at five poses (7-11). Start poses for the two robots are marked with gray circles. Final poses are indicated with stars. Intermediate poses for robot A are indicated as circles 2-5; intermediate poses for robot B are indicated as circles 8-10. Observations of the same scene or exchanges of information between robots results in loop closures between positions. As indicated in the figure, there are loop closures (common observations or measurements) between poses 2 and 6 for robot A, and between poses 8 and 10 for robot B. In addition, there is a multi-robot pose constraint (e.g., a common observation or measurement) between pose 3 of robot A and pose 10 of robot B. These multi-robot (MR) pose constraints are also indicated in the factor graph and in the topological graph.

Figure 2:
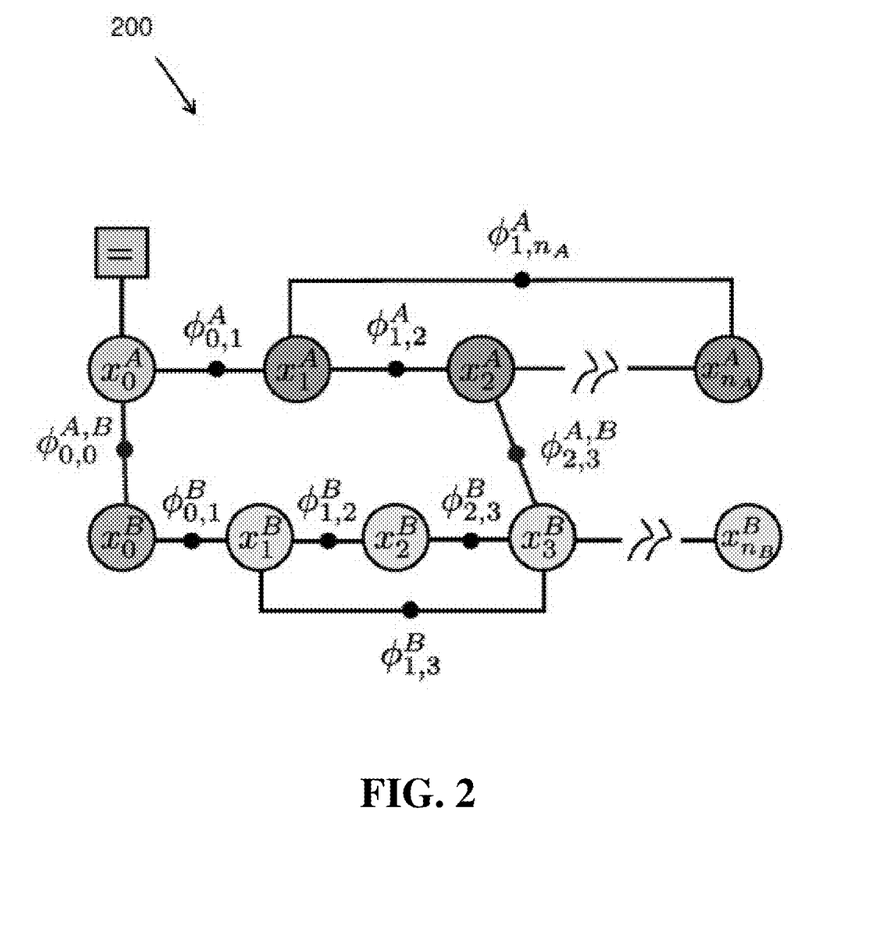
FIG. 2 shows an example of a factor graph representing the joint probability distribution for the multi-robot belief for the candidate navigation paths of the two robots A and B, according to an embodiment of the present invention.

FIG. 2 shows an example of a factor graph representing the joint probability distribution (6) for the multi-robot belief for the candidate navigation paths of the two robots A and B in FIG. 1. Probabilistic factors (t. represent pose constraints in pose graph optimization.

Figure 3:
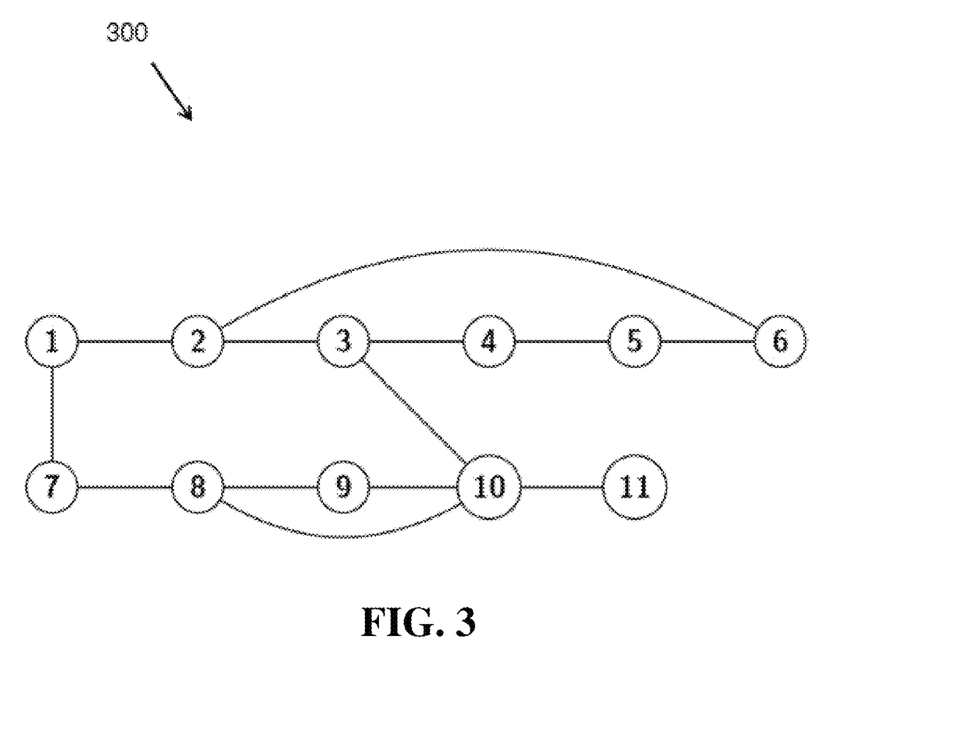
FIG. 3 shows a topological graph corresponding to the factor graph of FIG. 2, according to an embodiment of the present invention.

FIG. 3 shows a topological graph corresponding to the factor graph of FIG. 2. The number of future sampled states of the robots A and B are $n_A = 5$ and $n_B = 4$, respectively. (Node labeling is arbitrary.)

When the map feature states are maintained with the robot's trajectory, the observation model (3) can be written in the form $$z_{i,j}^f = g(x_i, l_j) + v_{i,j}^f, \quad (9)$$

where $x_i$ represents the robot's pose at time $t_i$, $l_j$ feature state vector belonging to the j-th landmark and $v_{i,j}^f$, a noise in sensor measurement of that feature.

Graph Signature Metrics

Embodiments of the present invention provide a metric of topological graph complexity for characterizing a graph G associated with a factor graph FG as a signature candidate for the optimization objective defined by (2). Two graph signatures described hereinbelow are Von Neumann (VN) entropy and spanning-tree (ST).

Von Neumann Signature

The Von Neumann entropy $H_{VN}(G)$ of graph G is the Shannon entropy associated with its normalized Laplacian's eigenvalues $\{\hat{\lambda}_i\}_{i=1}^{|\Gamma|}$. The concept of the Von Neumann entropy of a graph was introduced in Passerini and Severini, "Quantifying Complexity in Networks: The Von Neumann Entropy," Int. J. Agent Technol. Syst., Vol. 1, No. 4, 2009, pp. 58-67, doi:10.4018/jats.2009071005, which is incorporated herein by reference. The Von Neumann entropy may be written with convention 0 ln 0=0 as:

$$s_{VN}(G) = -\sum_{i=1}^{|\Gamma|} \frac{\hat{\lambda}_i}{|\Gamma|} \ln \frac{\hat{\lambda}_i}{|\Gamma|}. \quad (10)$$

Using Han's quadratic approximation, this may be simplified to:

$$s_{VN}(G) \approx \sum_{i=1}^{|\Gamma|} \frac{\hat{\lambda}_i}{|\Gamma|} \left(1 - \frac{\hat{\lambda}_i}{|\Gamma|}\right) \quad (11)$$

$$= \frac{\sum_{i=1}^{|\Gamma|} \hat{\lambda}_i}{|\Gamma|} - \frac{\sum_{i=1}^{|\Gamma|} \hat{\lambda}_i^2}{|\Gamma|^2} = \frac{Tr[\hat{L}]}{|\Gamma|} - \frac{Tr[\hat{L}^2]}{|\Gamma|^2}. \quad (12)$$

The normalized Laplacian matrix $\hat{L}$ is symmetric with unit diagonal. Therefore, $Tr[\hat{L}]=|\Gamma|$, and, after some basic matrix manipulations, $$Tr[\hat{L}^2] = |\Gamma| + \sum_{(i,j)\in E} \frac{1}{d(i)d(j)}. \quad (13)$$

Given the above, an expression for a Von Neumann entropy approximation that may be used as a graph signature is:

$$s_{VN}(G) \approx \hat{s}_{VN}(G) = 1 - \frac{1}{|\Gamma|} - \frac{1}{|\Gamma|^2} \sum_{(i,j)\in E} \frac{1}{d(i)d(j)}. \quad (14)$$

The computation depends only on the degree matrix D(G) and, in general case, has quadratic complexity in the number of nodes, $O(|\Gamma|^2)$ but in the case of BSP, where $\hat{L}$ is sparse it depends only on the small number of non-zero elements of A(G), i.e. the number of edges |E| in the graph G. Also, the expression (14) can be computed incrementally, as new edges (measurements) are added to the multi-robot factor graph as the robots explore the environment or re-plan their paths.

Alternative definition. To rank control actions, we can also use the following definition of the Von Neumann entropy with different scaling of the eigenvalues since we know that $\hat{\lambda}_i \in [0,2]$:

$$s_{VN}(G) = -\sum_{i=1}^{|\Gamma|} \hat{\lambda}_i/2 \ln(\hat{\lambda}_i/2). \quad (15)$$

which can be simplified to $$s_{VN}(G) \approx \frac{|\Gamma| \ln 2}{2} - \frac{1}{2}\sum_{i=1}^{|\Gamma|} \hat{\lambda}_i(\hat{\lambda}_i - 1) = \frac{|\Gamma| \ln 2}{2} - \frac{1}{2}(Tr[\hat{L}^2] - |\Gamma|). \quad (16)$$

and finally to $$s_{VN}(G) \approx \hat{s}_{VN}(G) = |\Gamma|/2 \ln 2 - \frac{1}{2}\sum_{(i,j)\in E} \frac{1}{d(i)d(j)}. \quad (17)$$

Spanning-Tree Signature

An additional metric for the graph signature may be a spanning tree (ST) metric, based on the number of spanning trees t(G) in a graph G. The calculation of t(G) was described in the context of measurement selection and graph pruning by Khosoussi, et al., "Reliable graph topologies for SLAM," IJRR, 2018, which is incorporated herein by reference. By this metric, $$\ln|\Sigma(X_{k+L})| \approx -3 \ln(t(G)) - \ln(\eta), \quad (18)$$

where η depends on the noise variances and geometry and, in the case of BSP, on the graph dimension n (number of graph nodes). We can write η=Cξ, where C captures the geometry and the noise parameters and is assumed constant, i.e. independent on the FG topology, while ξ is a function of graph dimension n. Minimizing (2) can therefore be formulated as $$\mathcal{U}^* = \quad (19)$$
$$\arg\max_{\mathcal{U}}[-J(\mathcal{U})] \approx \arg\max_{\mathcal{U}}\left[\frac{3}{2}\ln t(G) + \frac{\ln(\xi)}{2} - \frac{n}{2}\ln(2\pi e) + const.\right].$$

The value ξ can be determined from the odometry factor graph associated with $b[X_{k+L}]$. Given its process noise information matrix is $\Omega_w$ and its topological graph $G^o$ contains n nodes, it follows from (18), as $t(G^o)=1$, that $\ln(\eta)=n \ln(|\Omega_w|)$. From this, we can derive a normalized value of an ST signature, $s_{ST}(G)$ that maximizes (19), a full derivation of which is described in the ST signature derivation section hereinbelow. As shown in the full derivation:

$$s_{ST}(G) = \frac{3}{2}\tau(G) + \frac{n}{2}[\ln|\Omega_w| - \ln(2\pi e) + const] \quad (20)$$

Both graph signatures, VN and ST, are metrics that can be used to compare BSP control actions. An advantage of using the VN signature is that it is faster, O(|E|), and possible incremental calculations depending only on the node degrees, which can be updated easily. The number of spanning trees in a graph is equal to any cofactor of its Laplacian matrix, whose determination is an operation with cubic complexity in the number of nodes for general dense graphs. Because SLAM graphs typically have a small number of edges due to limited sensor range and field of view, their graph Laplacian is sparse and state-of-the-art algorithms use this fact to efficiently calculate τ(G) by performing sparse matrix factorization. However, this approach, to be efficient, still requires finding a good fill-reducing permutation of SLAM reduced graph Laplacian associated to this cofactor. The problem of finding the best ordering is an NP-complete problem and is thus intractable, so heuristic methods are used instead. Even with a good variable ordering, finding a matrix factorization is still more expensive than updating node degrees.

ST Signature Normalization, Full Derivation

In order to derive the graph signature based on the number of spanning trees t(G) to be used in BSP for optimizing objective (2), we will use the results of Khosoussi regarding the relation of t(G) to a determinant of Fisher information matrix of a Maximum Likelihood (ML) pose SLAM estimator. In (6) we assumed that relative pose measurements belonging to the factors of b[$\mathcal{P}$] of the joint multi-robot state $X_n$ at planning time $t_n$ are independent identically distributed Gaussian random variables, so they can be generated according to $$z = h(X_n) + \epsilon, \epsilon \sim \mathcal{N}(0, \Sigma), \quad (21)$$

where z is a stacked vector of relative pose measurements (all odometry, loop closing and multi-robot constraints) and $\Sigma$ is a diagonal measurement noise covariance matrix. We denote by $X_n = [\{X_{n_r}^r\}_{r=1}^R]$ the joint state composed of poses sampled on the paths of all R robots with $n_r$ denoting a dimension of a state belonging to a path $\mathcal{P}^r$ of a single robot r, and n the dimension of the joint state.

The ML SLAM optimization problem can be then formulated as $$X_n^* = \arg\min_{X_n} \|z - h(X_n)\|_{\Sigma^{-1}}^2 \quad (22)$$

$$= \arg\min_{X_n} \sum_i \|z_i - h(x_{j_1}, x_{j_2})\|_{\Omega_w^i}^2, \quad (23)$$

where $z_i$ is a relative pose measurement between poses $x_{j_1}$ and $x_{j_2}$. For simplicity we proceed with a 2D SLAM setting and assume that $\Omega_w^i = \Omega_w = \text{diag}(\sigma_p^{-2}, \sigma_p^{-2}, \sigma_\theta^{-2})$, i.e. process noise information matrix with $\sigma$hd $p^2$ and $\sigma_\theta^2$ being the position (p) and angular ($\theta$) variances respectively. The Fisher information matrix $I(X_n)$ given the measurement model (21) is given by Sorenson, "Parameter estimation: principles and problems," Vol. 9, M. Dekker, 1980, which is incorporated herein by reference.

$$I(X_n) = J^T \Sigma^{-1} J, \quad (24)$$

where $J = \partial h/\partial X_n$ is a measurement Jacobian. $I^{-1}(X_n)$ evaluated at true value of $X_n$ is known as Cramér-Rao lower bound. Commonly, covariance matrix of ML estimate is approximated with inverse of a Fisher information matrix evaluated at ML estimate $X_n^*$.

Typically, multi-robot factor graphs are composed of odometry factors and initial pose constraints, which may be used in derivation of the normalization of the spanning tree graph signature. In general, different robots have paths of different lengths $L(\mathcal{P}^r)$ or planning horizons $L_r$, $r \in 1, 2, \ldots, R$.

Now, let a factor graph $FG^o$ representing a multi-robot belief b[$\mathcal{P}^o$] be composed of only the odometry factors, i.e. $\Pi_{r=1}^R \Pi_{l=1}^{L(\mathcal{P}^r)} \mathbb{P}(x_l^r | x_{l-1}^r, u_{l-1}^r)$, and relative transformations of initial robots' poses $z_0^{r,r'}$ that enable establishing a common reference frame. The later are represented by pdfs $\mathbb{P}(z_0^{r,r'} | x_0^r, x_0^{r'})$ for involved pairs of robots r, r' in a group. $FG^o$ is a subgraph of a factor graph FG associated to b[$\mathcal{P}$] given by (6) and its topological graph $G^o$ is a tree.

In Khosoussi, bounds of $\ln \det I(X_n)$ are shown to be $$3\tau(G) + \ln \det I_o(X_n) \leq \ln \det I(X_n)$$

$$\leq 2\tau(G) + \ln \det(\tilde{L} + \Psi I) + \ln \det I_o(X_n), \quad (25)$$

where $\tilde{L}$ is a reduced Laplacian of a graph G obtained by removing arbitrary row and column of L, $I_o(X_n)$ information matrix associated to any tree sub-graph and $$\Psi \doteq \frac{\sigma_\theta^2}{\sigma_p^2} \max_i (\Delta^T \Delta)_{ii} \quad (26)$$

where $$(\Delta^T \Delta)_{ii} = \sum_{j \in \{j | (i,j) \in E\}} \|p_i - p_j\|^2.$$

Notice that $\Psi$ depends only on the noise variances and geometry of the SLAM graph. Therefore, for small values of $\Psi$ a good approximation of $\ln \det I(X_n)$ is its bound, i.e.

$$\ln \det I(X_n) \approx 2\tau(G) + \ln \det(\tilde{L} + \Psi I) + \ln \det I_o(X_n) \quad (27)$$

The second term in (27) can be expressed using Matrix determinant lemma and Matrix tree theorem as $$\ln \det(\tilde{L} + \Psi I) = \ln \det \tilde{L} + \ln \det(I_n + \tilde{L}^{-1}\Psi) \quad (28)$$

$$= \tau(G) + \ln \det(I_n + \tilde{L}^{-1}\Psi). \quad (29)$$

Consequently, using the notation $\eta = C\xi$, we can write $$\ln \det I(X_n) \approx 3\tau(G) + \ln \overbrace{\det(I_n + \tilde{L}^{-1}\Psi)}^{c} + \ln \overbrace{\det I_o(X_n)}^{\xi}. \quad (30)$$

Also, C is almost constant for small enough $\Psi$. Using Lemma 2 and Lemma 3 from Khosoussi, for b[$\mathbb{P}^o$] whose topological graph $G^o$ is a tree, it follows $$\ln \det I_o(X_n) = \tau(\underbrace{G_o}_{0}) + \ln(\sigma_p^{-4}\sigma_\theta^{-2})^n = n \ln \det \Omega_w. \quad (31)$$

Therefore, $$\ln \det I(X_n) \approx 3\tau(G) + n \ln \det \Omega_w + \text{const} \quad (32)$$

Putting (32) into the expression for objective function (2) and using the fact that $\ln \det I(X_n) = -\ln \det \Sigma(X_n)$, the expression for properly normalized graph signature for use in BSP (20) follows.

Sub-Sampling and Optimization

After obtaining graph signatures for all candidate path combinations, a sub-sampling strategy may be employed, depending on the optimization objective's relation to the signature and on the available time resources we have. If we can assume that the BSP solution has high correlation with the signature, e.g. minimizing uncertainty in (2) corresponds to maximizing the graph's complexity (14), we can then choose the top $N_s$ best ranked signatures, evaluate the objective function for the corresponding actions, and then select the best among them. Alternatively, signatures may be clustered and a search performed for an optimal solution inside the best topology cluster. In that case, $N_s$ is proportional to the number of clusters and we assume that similar topology classes will produce similar costs. Notice that the proposed topological BSP algorithm can be considered as an anytime algorithm, as its solution quality depends on the available computational budget and is monotonically improved as more samples are considered.

Sample Signature Calculations

Figure 5A:
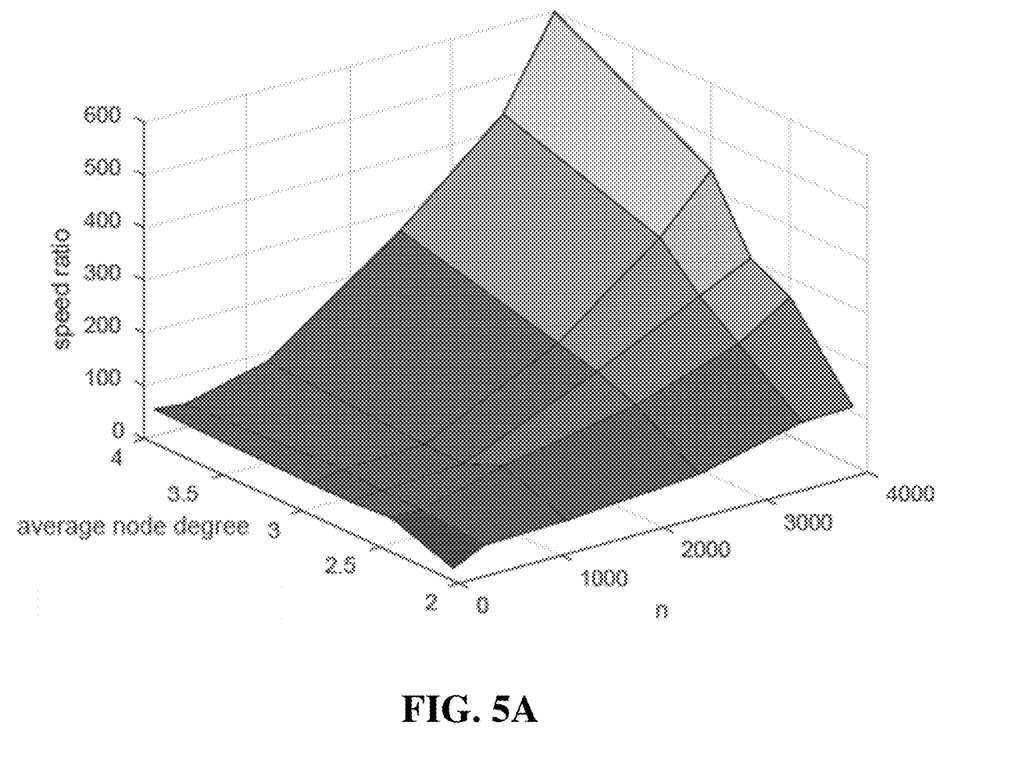
FIGS. 5A and 5B are graphs of simulation results of calculating Von Neumann (VN) spanning tree (ST) metrics for topology graphs of different node degrees and number of nodes, according to embodiments of the present invention.
Figure 5B:
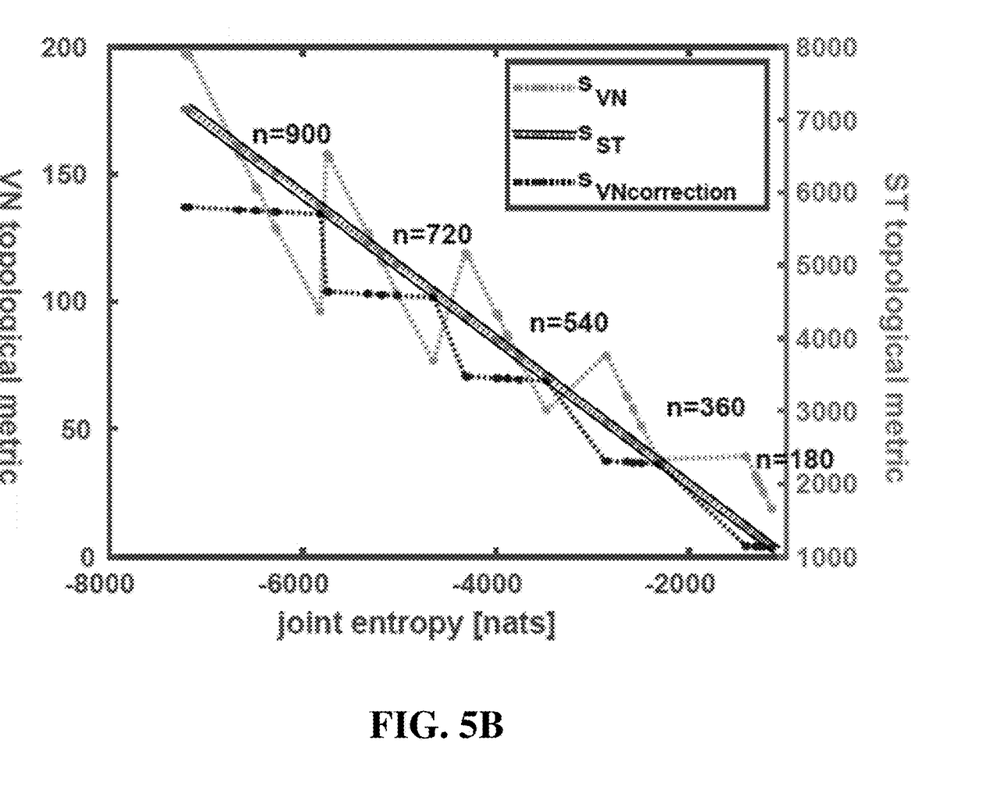

The VN signature metrics defined by the respective equations (15) and (17) may be written as:

$$s_{VN}(G) = -\sum_{i=1}^{n} \hat{\lambda}_i/2 \ln(\hat{\lambda}_i/2) \approx \qquad (33)$$

$$\hat{s}_{VN}(G) = n/2 \ln 2 - 1/2 \sum_{(i,j)\in E} 1/[d(i)d(j)], \qquad (34)$$

where $\hat{s}_{VN}(G)$ may be further normalized for improved action consistency as follows (as described below with respect to FIG. 5B):

$$\hat{s}_{VN}^{correction}(G) = \hat{s}_{VN}(G) + (n-1)/2[\ln |\Omega_{vij}| - \ln(2\pi e)^\kappa] \qquad (35)$$

The ST signature metric (20) may be written as:

$$s_{ST}(G) = \kappa/2 \ln t(G) + (n-1)/2[\ln|\Omega_{vij}| - \ln(2\pi e)^\kappa] \qquad (36)$$

Above, G=(V, E) is a topological graph, n=|V|, $\hat{\lambda}_i$ are the eigenvalues of the normalized Laplacian of G, and κ is the dimension of the robot pose (i.e., degrees of freedom, e.g. kappa=3 for planning in 2D, where robot's pose comprises 2 position coordinates x, y and a dimension representing orientation).

For the pair of candidate paths shown in FIG. 1, which correspond to the topological graph G in FIG. 3:

n=11, κ=3(for planning in 2D space).

Assuming all relative pose measurements have the same noise with standard deviation in position $\sigma_p$=0.1 m and $\sigma_\theta$=0.01 rad in orientation $$\Omega_w = \Omega_{vij} = \begin{pmatrix} \sigma_p^{-2} & 0 & 0 \\ 0 & \sigma_p^{-2} & 0 \\ 0 & 0 & \sigma_\theta^{-2} \end{pmatrix} = \begin{pmatrix} 100 & 0 & 0 \\ 0 & 100 & 0 \\ 0 & 0 & 10000 \end{pmatrix}$$

The graph Laplacian L and the node degrees vector d of the topological graph of FIG. 3 are indicated below. Note that the node degrees vector is the diagonal of the graph Lapacian, and other values of the graph Lapacian are either 0, for no connection between nodes, or −1 to indicate a connection:

$$L = \begin{pmatrix} 2 & -1 & 0 & 0 & 0 & 0 & -1 & 0 & 0 & 0 & 0 \\ -1 & 3 & -1 & 0 & 0 & -1 & 0 & 0 & 0 & 0 & 0 \\ 0 & -1 & 3 & -1 & 0 & 0 & 0 & 0 & 0 & -1 & 0 \\ 0 & 0 & -1 & 2 & -1 & 0 & 0 & 0 & 0 & 0 & 0 \\ 0 & 0 & 0 & -1 & 2 & -1 & 0 & 0 & 0 & 0 & 0 \\ 0 & -1 & 0 & 0 & -1 & 2 & 0 & 0 & 0 & 0 & 0 \\ -1 & 0 & 0 & 0 & 0 & 0 & 2 & -1 & 0 & 0 & 0 \\ 0 & 0 & 0 & 0 & 0 & 0 & -1 & 3 & -1 & -1 & 0 \\ 0 & 0 & 0 & 0 & 0 & 0 & 0 & -1 & 2 & -1 & 0 \\ 0 & 0 & -1 & 0 & 0 & 0 & 0 & -1 & -1 & 4 & -1 \\ 0 & 0 & 0 & 0 & 0 & 0 & 0 & 0 & 0 & -1 & 1 \end{pmatrix}, d = \begin{pmatrix} 2 \\ 3 \\ 3 \\ 2 \\ 2 \\ 2 \\ 2 \\ 3 \\ 2 \\ 4 \\ 1 \end{pmatrix}$$

The number of spanning trees of G is equal to any cofactor of its Laplacian matrix, i.e. t(G)=82. By definition, normalized graph Laplacian is $$\hat{L} = \text{diag}(d)^{-1/2} L \, \text{diag}(d)^{-1/2}.$$

For the given graph, eigenvalues of $\hat{L}$ are $\{\hat{\lambda}_i\}$={0, 0.17119, 0.36398, . . . 0.65906, 0.75561, 0.90491 1.2837, 1.5346, 1.6526, 1.807, 1.8674}.

Applying (33)-(36) gives the following signature metric values:

$s_{VN}(G)$=2.4141

$\hat{s}_{VN}(G)$=1.5762

$s_{ST}(G)$=56.1453

These numbers are ranks of the given candidate paths based on the different topological signature metrics. The same calculations would be performed for all other candidate robot paths, to determine the best path, or more precisely, the best control actions to achieve the best path. For example, if we consider a control that produces the same topological graph but without an edge (3, 10), meaning that corresponding combination of candidate paths will not lead to this particular multi-robot constraint, the ranks given by different signatures would be:

$s_{VN}(G)$=2.2437

$\hat{s}_{VN}(G)$=1.3679

$s_{ST}(G)$=53.597

By all three topological signatures, we see that the rank of the control action that includes the edge (3, 10) is better. In other words, the cost of the first control action is smaller. In general, the ranks of actions for different topological signatures can vary depending on the accuracy of approximations. In practice, we need to calculate only one signature for ranking actions depending on the computational power available in a given application.

Experimental Selection Results

Figure 4A:
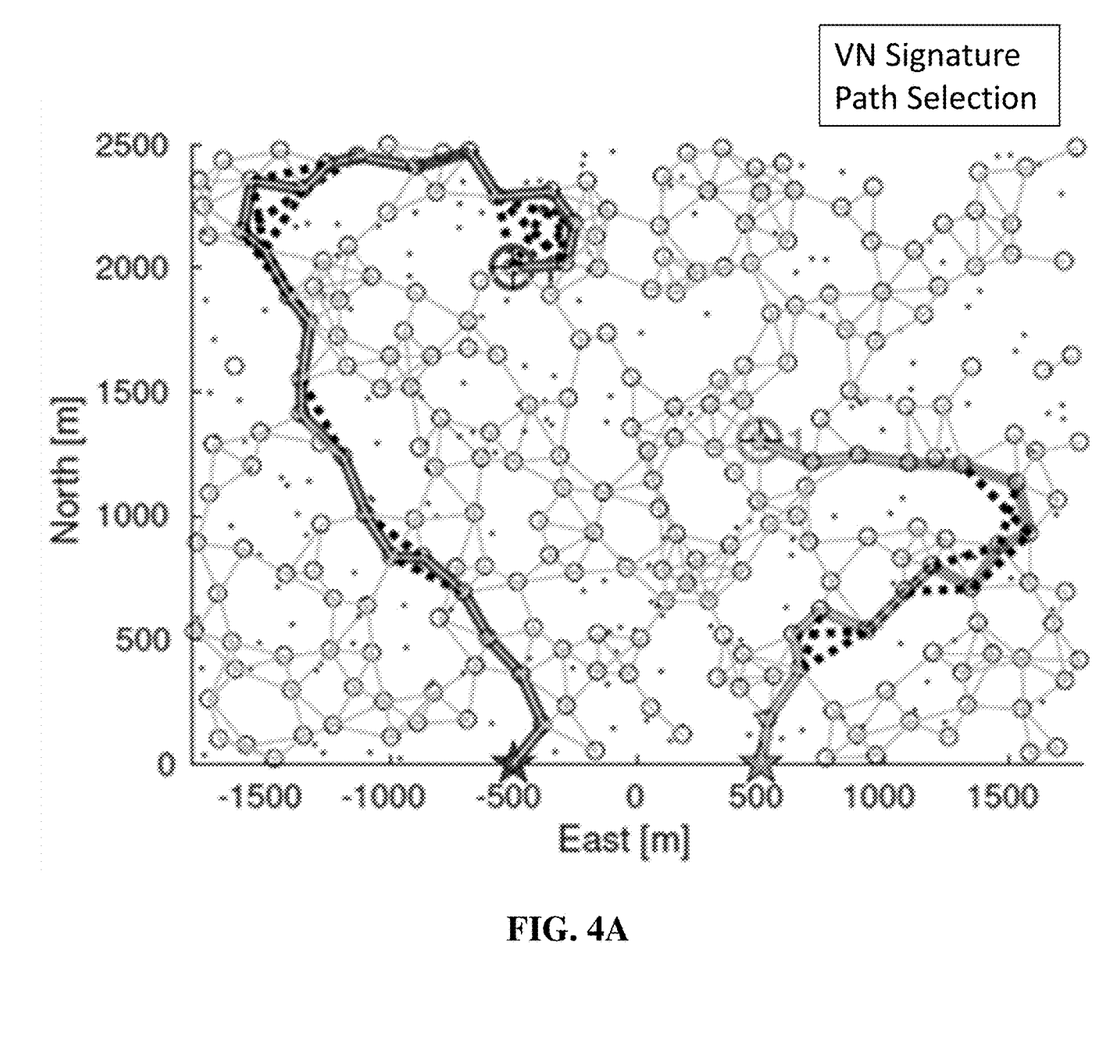
FIGS. 4A and 4B show candidate paths for two robots in a single planning session, and the paths selected by signature ranking vs. optimal planning, according to embodiments of the present invention.
Figure 4B:
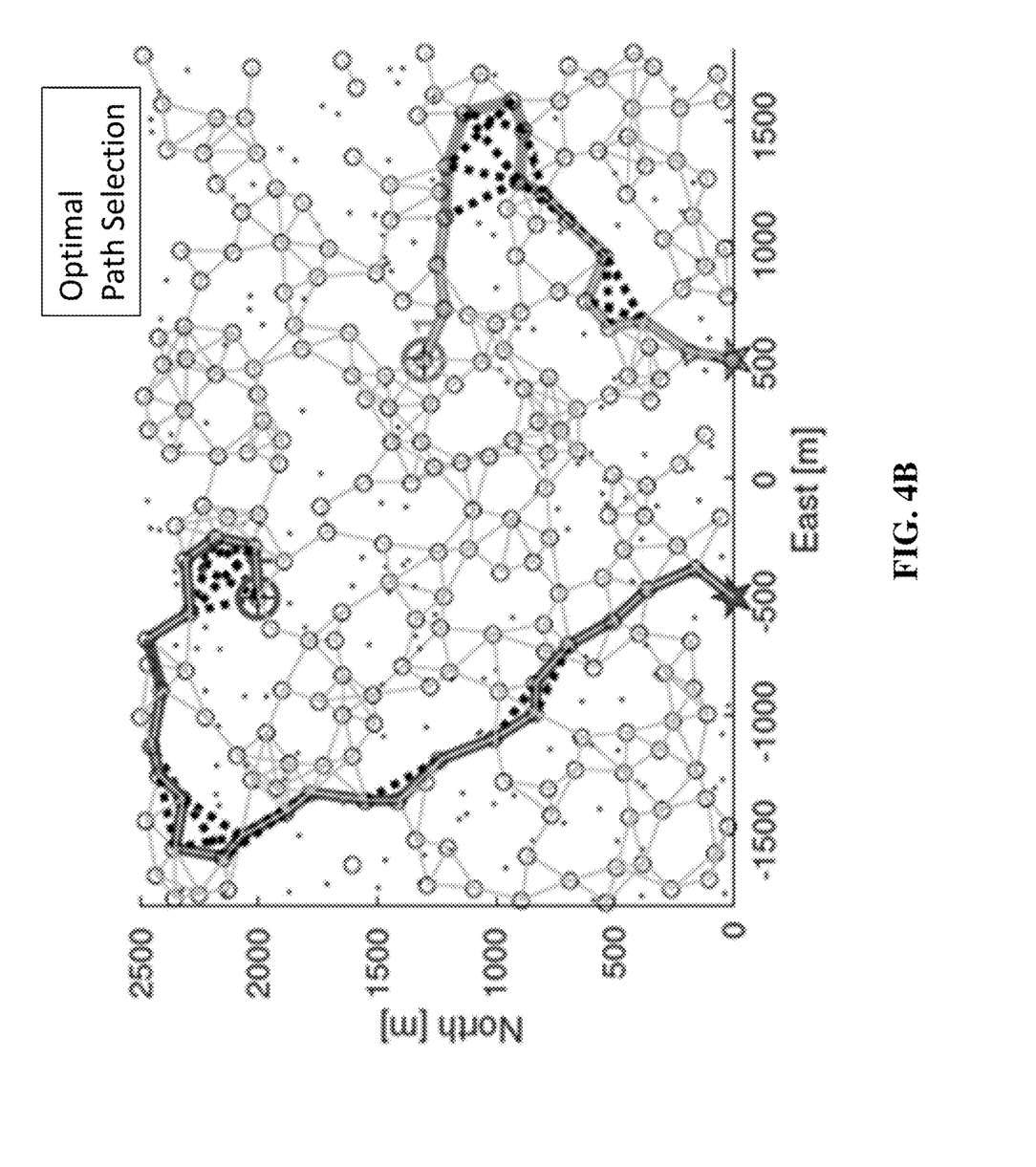

Matlab using GTSAM was used to investigate key aspects of the topological BSP signature ranking. A probabilistic roadmap (PRM) was used to discretize the environment and generate candidate paths over the roadmap. Given two robots, each having 10 candidate paths, means that in every planning session 100 different factor graphs are formed representing the multi-robot belief of the corresponding controls and predicted observations. We used a simple heuristic for the function to determine if two poses admit a multi-robot pose constraint: these constraints, possibly involving different future time instances, are formulated between any two poses with relative distance closer than d=320 meters. In every planning session, topological BSP algorithms chose one sample (path combination) to evaluate the objective function according to their corresponding signature and sub-sampling strategy. For the objective of minimizing the global entropy, we selected the top best ranked signature. FIGS. 4A and 4B show candidate paths for 2 robots in a single planning session, and the paths selected by signature ranking vs. optimal planning. Robots' paths are marked with dark gray and light gray double lines, respectively, multi-robot constraints with light gray lines, and loop closure constraints with dashed black lines.

In a second simulation, we showed that good action consistency is still kept even when comparing significantly varying pose graphs. We generated pose graphs with varying number of nodes n and edges tn, of which n−1 correspond to odometry and the rest to LC=m−n+1 loop closing factors. We choose LC=$\Delta \bar{d} n/2$, causing average node degree of a graph increasing in steps of $\Delta \bar{d} \in$ {0.1, 0.5, 0.75, 1, 2} from a given odometry graph of size n (whose average node degree is approx. 2).

For each pair (n, tn) we created a group of 10 random topologies, calculated their topological metrics $s_{ST}$ and $\bar{s}_{VN}$, and measured the average time for calculating $t_{ST}$ and $t_{VN}$ respectively. The results of this simulation are given in FIGS. 5A and 5B. FIG. 5A demon-strates that $\hat{s}_{VN}$ is calculated much faster than $s_{ST}$ for high dimensional BSP problems. FIG. 5B shows that correlation with the posterior entropy of the Fischer Information Matrix (FIM) of the Maximum Likelihood Estimator (MLE) is high for $s_{ST}$ over the whole range of topologies while $\hat{s}_{VN}$ follows the overall trend and is high for graphs with the same n, but breaks the action consistency with jumps of n. This suggests that normalization $f$ of $\hat{s}_{VN}$ should be applied according to its relation to the objective, as indicated in the correction (35), by which the second term in equation (36) for $s_{ST}$ was added to $\hat{s}_{VN}$ to improve action consistency.

Determining Error Bounds

The above results can be extended to a BSP problem to provide online performance guarantees of topological BSP.

Reliability of SLAM topology

In the context of Maximum Likelihood Estimation (MLE) in pose SLAM, the optimal set of poses $X_k$ for which the belief (4) is maximized can be obtained by fixing one of the poses, e.g. $x_0$, and treating the rest as unknown (or with an uninformative prior) while minimizing the sum of weighted squared errors between predicted and measured relative poses, i.e.

$$\hat{X}_k = \arg\max_{X_k} \mathbb{P}(\Delta_k \mid X_k) \equiv \arg\min_{X_k} \|\Delta_k - h(X_k)\|^2_{\Sigma^{-1}}. \quad (37)$$

(Because the state $x_0$ is considered deterministic, here we estimate the rest of the variables $X_k=\{x_1, x_2, \ldots, x_k\}$ and $I(X_k)$ denotes their joint information matrix from now on.)

In this formulation, a measurement $\Delta_k$ represents a vector of m stacked relative pose measurements $z_{i,j} \in SE(2)$, $r=1,2, \ldots$ from motion and observation model (3) at time $t_k$ with $m=|E|$, the number of edges in the topological graph of the belief (4).

Relative pose measurements in pose SLAM resulting from state transitions can be obtained by the motion composition $z_{i+1,i}(x_i,x_{i+1})=\ominus x_i \ominus x_{i+1}=\ominus x_i \ominus f(x_i, u_i, w_i)$. In this work, we assume independent relative pose measurements with additive noises $$\Delta_k = h(X_k) + v_k, \; v_k \sim N(0, \Sigma^{-1}). \quad (38)$$

For simplicity, we also assume a 2D pose SLAM setting in which all relative positions and orientations between poses $x_i$ and $x_j$ have equal variance, $\sigma_p^2$ and $\sigma_\theta^2$ respectively, i.e. $\Omega_{v_{i,j}} = \text{diag}(\sigma_p^{-2}, \sigma_p^{-2}, \sigma_\theta^{-2})$.

The information matrix $I(X_k)$ of the MLE is $I(X_k) = H^T \Sigma^{-1} H$ where $H = \partial h / \partial X_k$ is a measurement Jacobian. $I(X_k)$ evaluated at the true value of $X_k$ is known as Fisher Information Matrix (FIM) and its inverse the Cramer-Rao lower bound (CRLB). Commonly, FIM is approximated with $I(\hat{X}_k)$.

In Khosoussi, cited above, bounds of the determinant of $I(X_k)$ are expressed in terms of pose SLAM graph topology, geometry and noise as $$3\tau(G) + \ln \det I_o(X_k) \leq \ln \det I(X_k)$$

$$\leq 2\tau(G) + \ln \det(\tilde{L} + \Psi I) + \ln \det I_o(X_k), \quad (39)$$

where $\tilde{L}$ is a reduced Laplacian of a graph G obtained by removing an arbitrary r-th row and r-th column of the graph Laplacian L, $I_0(X_k)$ estimated information matrix based on the odometry measurements $\Delta_k = \{z_{i+1,i}, i<k\}$, and $\Psi \doteq \xi^2 \text{dist}_{max}^2 \times$ where $\xi = \sigma_\theta / \sigma_p$, and $\text{dist}_{max}^2 = \max_{i \in V} \Sigma_{(i,j) \in E} \|x_i - x_j\|^2$.

Notice that generally $\Psi$ depends on the noise variances, geometry and topology of the SLAM graph. For small values of $\Psi$, a good approximation of $\ln \det I(X_k)$ is its bound that depends on $\tau(G)$, i.e. lower and upper bounds become tight.

Even when it is not negligible, if there is only one path realization to consider as in passive SLAM, information gain of adding relative pose measurements with constant noise distribution to a SLAM odometry graph is solely characterized by graph G topology, i.e. $\Psi = \Psi(G)$. Similar logic applies to the graph pruning and measurement selection problem described by Khosoussi, where all graphs are only subgraphs of the original graph with the same embedding in metric space. The same metric $\tau(G)$ cannot be used in BSP problems nor guarantee optimality using the bounds on $I(X_k)$, for the following reasons. In measurement selection problems, the robot considers, at planning time k, a single path and the factor graph of that path as well as which subset of measurements to take. Pose samples $X_{k+L}$ are fixed and minimizing entropy (2) by a measurements subset (action) is the same as maximizing $\ln|I(X_{k+L})|-\ln|I_o(X_{k+L})|$. Its bounds as can be seen from (39) depend only on the topology and $\xi$, i.e., all actions share the same pose variables $X_{k+L}$ which can be considered constant in optimization. ($\text{dist}_{max}$ can vary between actions but only because of the change in topology.) However, in BSP where a robot needs to compare different paths $\mathcal{U}$ corresponding to different factor graphs, this is not true anymore. To determine the best action according to (2), one has to account additionally for different path geometries and path lengths and larger variety of topologies.

In BSP we need to consider different path realizations $X_{k-L}$ and therefore $\Psi = \Psi(\mathcal{U}) = \Psi(X_{k+L}(\mathcal{U}), G(\mathcal{U}))$, in contrast to graph pruning and measurement selection.

It is not necessary to propagate belief in planning for determining $\Psi$ under ML observations assumption, i.e. $\mathbb{E}[X_{k+L}] = [\hat{X}_k x_{k+1} \ldots x_{k+L}]$ where future sampled poses from the path corresponding to action U are added to the prior state estimate $\hat{X}_k$ which is the same for all actions.

Decision Making by Typological BSP

The best control action obtained by solving the decision making problem using either of the topological metrics $s \in \{s_{ST}, s_{VN}, \hat{s}_{VN}\}$ is given by $$\hat{\mathcal{U}} = \arg\max_{\mathcal{U}} s(\mathcal{U}). \quad (40)$$

While the above topological metrics exhibit strong correlation with the information theoretic cost in the general case, the obtained best action $\hat{u}$ may be somewhat different than the optimal action $\mathcal{U}^*$ from (1), leading to some error in the quality of solution.

A definition of action consistent state approximations is described in Elimelech and Indelman, "Fast action elimination for efficient decision making and belief space planning using bounded approximations," Proc. of the Intl. Symp. of Robotics Research (ISRR), December 2017, which is incorporated herein by reference. Hereinbelow, we modify the definition to support topological BSP and action consistent objective approximation in the following way, giving the error of topological BSP as $$\epsilon(J, s) \doteq |J(\mathcal{U}^*) - f[s(\hat{\mathcal{U}})]|, \quad (41)$$

where $\hat{U}=\arg\max_u s(U)$ and f is a monotonic function such that $f[s(\hat{u})]=J(\hat{u})$ and $f = \arg\min_{f \neq f} \gamma_f$, where $\gamma_f = \max_u |J(U) - f[s(\mathcal{U})]|$.

In particular, $f$ for which (41) is zero, corresponds to topological BSP being action consistent, i.e. $\hat{\mathcal{U}} = \mathcal{U}^*$, and when also $\gamma_f = 0$, simplified representation preserves action order too.

In the case $s = s_{ST}$, we can select $f(s) = -s + \text{const.}$ to quantify the error in (41) because the topological metric $s_{ST}$ is designed as the negative value of the entropy J up to a constant, when approximation error is small. However, $f$ for $s_{VN}$ is more complicated, but we have shown empirically in realistic simulations that such function $f$ exists for which the error e is small.

Calculating $\epsilon(J, s)$ is essentially equivalent to solving the original problem. Therefore, a key aspect is to provide online performance guarantees by developing sufficiently tight bounds on $\epsilon(J, s)$ that can be evaluated online. One can then resort to topological BSP to reduce computational cost while carefully monitoring a conservative estimate on the sacrifice in performance, which would be provided by the bound on $\epsilon(J, s)$. Another perspective of using this bound is to guarantee global optimality of the topological BSP algorithm. In this approach, actions may be ranked by a topological metric and the objective function evaluated sequentially from best to worst. Having bounds on topological BSP error provides a stopping condition for action consistent topological BSP.

Entropy Bounds in BSP

In BSP, we have to consider multiple path realizations from different controls, with greater variety in both topology of factor graphs and other non-topological factors that influence estimation accuracy, e.g non-fixed geometry and different path lengths. Given a topological signature, such as given above $s_{ST}$ (20) for topological BSP, we may also provide global optimality guarantees of topological BSP based on this metric.

For a control action U corresponding to robot's poses $X_{k+L} = \{x_1, \ldots, x_{k+L}\}$ each of dimension $\kappa$, the entropy of the future posterior belief $b[X_{k+L}]$ can be written using Eq. (2) and the fact $\ln|\Sigma(X_{k+L})| = -\ln|I(X_{k+L})|$ $$J(\mathcal{U}) = (k+L)\kappa/2 \ln(2\pi e) - \frac{1}{2} \ln|I(X_{k+L})|. \tag{42}$$

Notice that the number of graph nodes $|V| = n = k+L+1$. Using Lemma 2 and Lemma 3 from Khosoussi, for posterior belief $b[\mathcal{P}^o] = \mathbb{P}(X_{k+L}|\mathcal{U}_{0:k+L-1})$ corresponding to an odometry factor graph whose topological graph $G^o$ is a tree, it follows $$\ln det I_o(X_{k+L}) = \underbrace{\tau(G^o)}_{0} + \ln(\sigma_p^{-4}\sigma_\theta^{-2})^{k+L} \tag{43}$$

$$= (k+L) \ln \det(\Omega_{v_{i,j}}).$$

Inequalities (39) and Eqs. (42) and (43) give the entropy bounds $\mathcal{LB}[J(U)] \leq J(U) \leq UB[J(U)]$, where $$\mathcal{UB}[J(\mathcal{U})] = \frac{(n-1)\kappa}{2} \ln(2\pi e) - \frac{1}{2}[3\tau(G) + (n-1) \ln |\Omega_{vij}|] \tag{44}$$

$$= -\frac{3}{2}\tau(G) - \frac{n-1}{2}\left[\ln |\Omega_{v_{i,j}}| - \ln(2\pi e)^\kappa\right] = -s_{ST}(\mathcal{U})$$

Similarly, for the lower bound we get $$\mathcal{L}_B[J(U)] = -s_{ST}(\mathcal{U}) - \frac{1}{2} \ln|\tilde{L} + \Psi(\mathcal{U})I_{n-1}| + \frac{1}{2}\tau(G) = \tag{45}$$

$$-s_{ST}(\mathcal{U}) - \frac{1}{2}[\ln|\tilde{L} + \Psi(\mathcal{U})I_{n-1}| - \ln|\tilde{L}|] = \tag{46}$$

$$-s_{ST}(\mathcal{U}) - \frac{1}{2} \ln|I_{n-1} + \tilde{L}^{-1}\Psi(\mathcal{U})|. \tag{47}$$

As applied in eq. (46) the matrix tree theorem states $t(G) = |\tilde{L}|$, and in eq. (47) Shur's determinant lemma. From eq. (47) we see that when $\Psi \to 0$, the entropy goes to the BSP topological metric and solely depends on the beliefs topology and path length. Otherwise, we have to account for the graph embedding in the metric space as well, as it appears in the scalar $\Psi$ of the second term in the above equations. Now, given all candidate control actions, the bounds on the topological BSP error are defined as:

$\epsilon(J, s_{ST}) \leq J_{max}$, where $$\Delta J_{max} = \mathcal{UB}[J(\hat{\mathcal{U}})] - \min_{\mathcal{U}} \mathcal{LB}[J(\mathcal{U})] \tag{48}$$

To prove the above equation for $\Delta J_{max}$, we may rewrite $\Delta J_{max}$ as $$\Delta J_{max} = \left\{ J(\hat{\mathcal{U}}) + \underbrace{\mathcal{UB}[J(\hat{\mathcal{U}})] - J(\hat{\mathcal{U}})}_{\delta(\hat{\mathcal{U}}) \geq 0} \right\} + \tag{49}$$

$$\left\{ -J(\mathcal{U}^*) + J(\mathcal{U}^*) - \underbrace{\min_{\mathcal{U}} \mathcal{LB}[J(\mathcal{U})]}_{\delta(\mathcal{U}^*) \geq 0} \right\}. \tag{50}$$

Therefore, $\delta = \delta(\hat{\mathcal{U}}) + \delta(U^*) \geq 0$ and $\Delta J_{max} = J(\hat{\mathcal{U}}) - J(U^*) + \delta \geq 0$ because $U^*$ is the minimum of the entropy. Also, $U\mathcal{B}[J(\hat{\mathcal{U}})] = -s_{ST}(\hat{\mathcal{U}})$ is the minimum upper bound of all actions because we select action in topological BSP according to eq. (40). We know that the optimal action must have entropy below this value, otherwise the selected action would be better which is contradiction by itself. Then, $\Delta J_{max} = J(\hat{U}) - J(\mathcal{U}) + \delta = |J(\hat{\mathcal{U}}) - J(U^*)| + \delta \Rightarrow |J(\hat{\mathcal{U}}) - J(U^*)| = \epsilon(J, s_{ST}) = \Delta J_{max} - \delta \leq \Delta J_{max}$.

The upper bound of the entropy is already determined by the topological metric as can be seen from eq. (44). However, calculating the lower bound requires an additional cost due to the second term in equations (45)-(47). Calculating it requires evaluating the determinant of a sparse matrix $M = \tilde{L} + \Psi I_{n-1} \in \mathbb{R}^{n-1 \times n-1}$.

A further goal is to find a fast method for limiting the determinant of M from above to replace the second term in eq. (45) so as not to introduce a large difference in the tightness of the lower bound. A direct approach for calculating a lower bound of the entropy includes sparse matrix factorization of M, e.g. Cholesky factorization $M = RR^T$ where R is the lower triangular matrix, from which then it is easy to calculate its determinant. However, this approach, to be efficient, still requires finding a good fill-reducing permutation $P_M$ of M. The problem of finding the best ordering is an NP-complete problem and is thus intractable, so heuristic methods are used instead. However, some calculations from the topological metric can be re-used. In particular, because M differs from $\tilde{L}$ only in diagonal elements, they both have the same sparsity pattern. Therefore, if $P_{\tilde{L}}$ is the best fill-reducing permutation of $\tilde{L}$ (already found for determining $|\tilde{L}|$), it can be re-used for calculation of the lower bound, i.e. $P_M = P_{\tilde{L}}$.

Because $\tilde{L}$ is a reduced graph Laplacian, it is symmetric positive definite (SPD), and because also $\Psi > 0$, the matrix M is SPD. For large values of $\Psi$, the matrix M becomes strongly diagonally dominant and Hadamard inequality gives a good approximation of its determinant, i.e.

$$|\tilde{L} + \Psi \; I_{n-1}| \leq \prod_{i=2}^{n} [d(i) + \Psi]. \qquad (51)$$

Calculation of the right side of inequality (51) requires only multiplication of node degrees with added value of $\Psi$. Applying (51) to eq. (45), we can get somewhat more conservative but faster to compute lower bound $$\mathcal{LB}[J(\mathcal{U})] = -s_{ST}(\mathcal{U}) + 1/2 \left( \tau(\mathcal{U}) - \sum_{i=2}^{n} \ln \; [d_{\mathcal{U}}(i) + \Psi(\mathcal{U})] \right) \qquad (52)$$

Performance guarantees can be either in the form of a selected solution's entropy upper bound, i.e. guarantees on the accuracy, or in bounding the error of topological BSP with respect to the optimal solution.

The first form can be used when the maximum admissible path uncertainty is known at the planning time, e.g. for obstacle avoidance. In that case, one can get an answer if a topological BSP solution satisfies the specification by ranking actions using very efficient O(m|A|) topological metric $\hat{s}_{VN}$ and calculating only its entropy's upper bound. If global optimality guarantees are required, the topological metric $s_{ST}$ needs to be calculated for all actions, it is currently a good choice as a graph signature. If an uncertainty specification is not met by topological BSP, one can still use its ranked actions. Also, if an optimal solution needs to be found, we can use topological BSP to eliminate suboptimal actions.

Path Selection with Error Bounds

Figure 6:
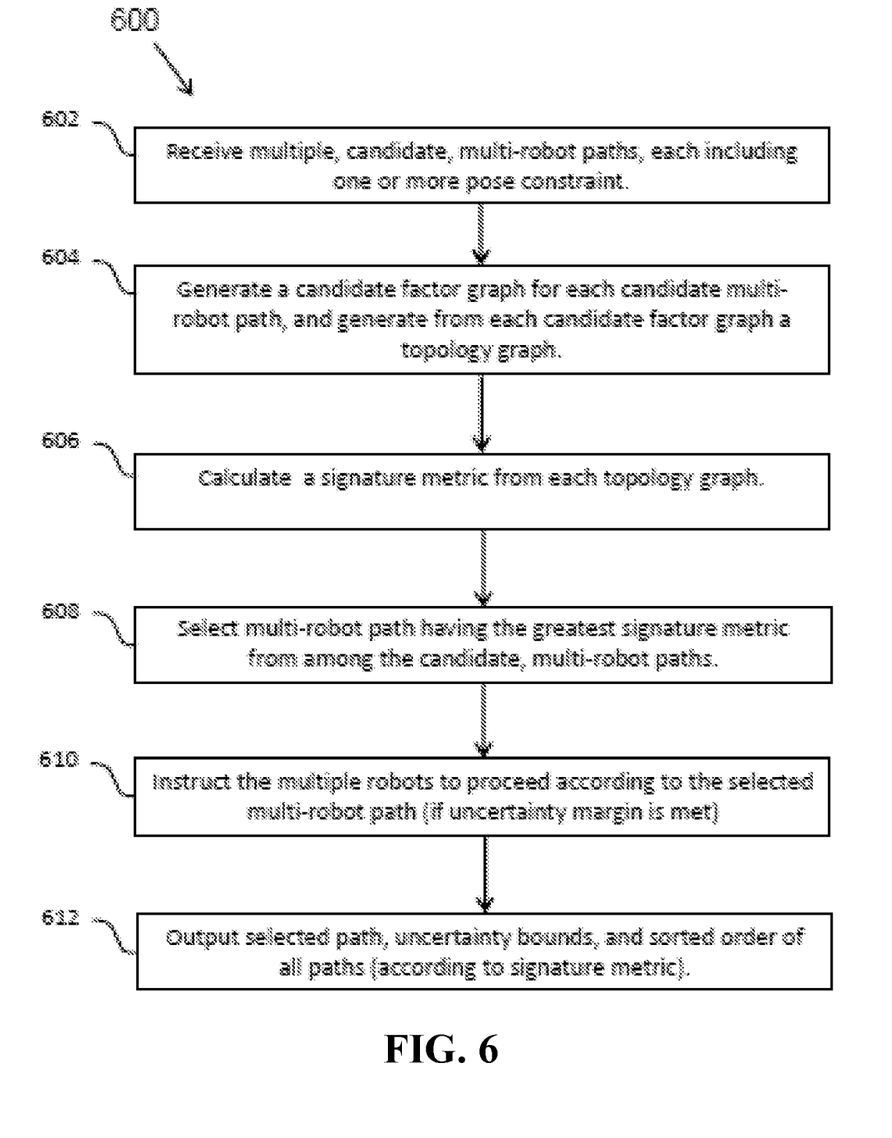
FIG. 6 is a flow chart of a process 600 for selecting an approximate solution Û for optimal BSP control actions to reduce uncertainty, according to an embodiment of the present invention.

FIG. 6 is a flow chart of a process 600 for selecting an approximate solution $\hat{U}$ for optimal BSP control actions to reduce uncertainty, according to an embodiment of the present invention. Steps of process 600 are implemented by a system including a computer processor configured to execute the following instructions.

At a step 602, the system receives multiple, candidate, multi-robot paths, each including one or more pose constraints. The multiple paths may be provided as respective factor graphs, or the respective factor graphs may be generated by the system at a subsequent step 604, at which the system also generates from each candidate factor graph a topology graph. Next, at a step 606, the system calculates a signature metric from each topology graph, wherein the signature metric is one of a Von Neumann (VN) metric and a spanning tree (ST) metric. At a step 608, the system selects a multi-robot path having the greatest signature metric from among the candidate, multi-robot paths. At a step 610, the system may then instruct the multiple robots to proceed according to the selected multi-robot path. The system may also output, at a step 612, a sorted list of the multiple, mult-robot paths, according to the calculated signature metrics. Alternatively or additionally, the system may determine whether the selected path meets a preset uncertainty margin and may forgo outputting an instruction if the uncertainty margin is not met. The system may also calculate and output (at step 612) uncertainty bounds, the bounds being calculated as described above.

The following outline describes a variation of the process using mathematical notation and indicating optional output.

Input: Set of factor graphs FG corresponding to control actions U

Output: Approximate solution to the BSP $\hat{U}$ and its performance guarantees or actions subset A Parameters: Graph signature $s \in \{s_{ST}, s_{VN}, \hat{s}_{VN}\}$, uncertainty margin $\gamma$ (optional)

Steps:
1. Receive input, set S=;
2. Represent each FG with a topological graph G(U);
3. Iterate, for each U:
   Evaluate the topological metric $s(U) \doteq s[G(U)]$;
   $S = S \cup \{U, s(U)\}$
4.

Select $\hat{U} = \underset{\mathcal{U}}{\operatorname{argmax}} \; s(\mathcal{U})$;

5. $UB[J(\hat{U})] = s_{ST}(U)$;
6. If uncertainty margin $\gamma$ is given then, if $UB[J(\hat{U})] < \gamma$, Return $\hat{U}$
7. Else A=sort(S) with respect to topological metric, Return A
8. If uncertainty margin $\gamma$ is not given, then $\mathcal{LB}_{min} = \underset{\mathcal{U}}{\min} \mathcal{LB}[J(\mathcal{U})]$ using eq. (52);

$\Delta J_{max} = \mathcal{UB}[J(\hat{\mathcal{U}})] - \mathcal{LB}_{min}$;

$A = \{\mathcal{U} \in S : \mathcal{LB}[J(\mathcal{U})] < \mathcal{UB}[J(\hat{\mathcal{U}})]\}$;

Return $\hat{\mathcal{U}}$, t–bsp error bound $\Delta J_{max}$, A

Performance guarantees can be either in the form of selected solution's entropy upper bound, i.e. guarantees of accuracy, or in the form of bounding the error of the solution with respect to the optimal solution. The first form can be used when the maximum admissible path uncertainty is known at the planning time, e.g. for obstacle avoidance. In that case, one can get an answer if a solution satisfies the specification by ranking actions using the topological metric $\hat{s}_{VN}$, which is O(m|A|) efficient, and calculating only its entropy's upper bound. If global optimality guarantees are required, the topological metric $s_{ST}$ needs to be calculated for all actions. In the first usage, if an uncertainty specification is not met, the ranked actions set A can be used in an anytime algorithm.

What is claimed:

1. A method of belief space planning for navigating multiple robots from initial poses to respective target goals for each robot, while reducing trajectory uncertainty, the method comprising:
   for each robot of the multiple robots, generating a set of candidate paths for navigating from its initial pose to its respective target pose, each candidate path including a sequence of discrete poses that are reached by sequential transitions caused by respective control actions;
   generating candidate multi-robot paths, each candidate multi-robot path including one candidate path from the set of candidate paths for each of the multiple robots, wherein each candidate multi-robot path has associated transition and observation constraints, wherein the transition constraints indicate the sequential transitions of each robot along its respective candidate path, and observation constraints indicate observations between poses, determined by a relative distance between poses of two robots or between poses of the same robot at different times, and wherein the sequential transitions and observations have zero-mean Gaussian process and measurement noise;

generating a topology graph of each candidate multi-robot path, wherein nodes of each topology graph represent poses of robots along candidate paths, with all the poses of the robots along all the candidate paths of the candidate multi-robot path being represented in the given topology graph, and wherein edges connecting nodes represent the transition and observation constraints between the poses;

calculating a signature metric for each topology graph, wherein the signature metric is calculated, based on parameters of a Laplacian matrix of each topology graph, as one of a Von Neumann graph entropy approximation or a metric of the number of spanning trees of each topology graph;

adding to each signature metric a correction to generate a normalized signature metric, wherein the correction is a function of the number of nodes of each topology graph and a determinant of an information matrix of the measurement noise;

selecting a multi-robot path having the greatest normalized signature metric from among the candidate multi-robot paths; and navigating the multiple robots to proceed according to the selected multi-robot path.

2. The method of claim 1, wherein the Von Neumann graph entropy approximation is calculated as $$\hat{s}_{VN}(G) = n/2 \ln 2 - 1/2 \sum_{(i,j) \in E}^{n} 1/[d(i)d(j)]$$

$$\hat{s}_{VN}^{correction}(G) = \hat{s}_{VN}(G) + (n-1)/2[\ln |\Omega_{vij}| - \ln(2\pi e)^\kappa]$$

and the normalized signature metric is calculated as $$\hat{S}_{VN}^{corrected}(G) = \hat{S}_{VN}(G) + (n-1)/2[\ln |\Omega_{vij}| - \ln(2\pi e)^\kappa]$$

where G is the topology graph, E represents all edges of the topology graph G, i and j are indices of a pair of nodes connected by an edge, d(i) and d(j) are node degrees of respective nodes i and j, n is the number of nodes of G, κ is the number of degrees of freedom of each of the poses of the robots along all candidate paths of the candidate multi-robot path, $\Omega_{vij}$ is the information matrix of measurement noise, and |·| is a determinant function.

3. The method of claim 1, wherein the normalized signature metric is calculated according to the number of spanning trees of the topology graph as:

$$s_{ST}(G) = \kappa/2 \ln t(G) + (n-1)/2[\ln |\Omega_{vij}| - \ln(2\pi e)^\kappa]$$

where G is the topology graph, n is the number of nodes of G, t(G) is the number of spanning trees of G, $\Omega_{vij}$ is the information matrix of the measurement noise, |·| is a determinant function, and κ is the number of degrees of freedom of each of the poses of the robots along all candidate paths of the candidate multi-robot path.

4. The method of claim 1, further comprising calculating error bounds and determining that an uncertainty measure of the selected multi-robot path meets design specifications for accuracy and relative error with respect to a solution of multi-robot path selection by belief propagation and evaluation of an objective function.

* * * * *